United States Patent [19]
Russell et al.

[11] 3,872,839
[45] Mar. 25, 1975

[54] ROTARY PISTON ENGINE

[76] Inventors: Charles R. Russell, 3071 Marilyn Way, Santa Barbara, Calif. 93105; James R. Woods, II, 1703 Santa Barbara, Obispo, Calif. 93401

[22] Filed: Mar. 28, 1974

[21] Appl. No.: 455,553

[52] U.S. Cl......... 123/8.31, 123/122 R, 123/122 A, 165/4, 165/9, 165/52
[51] Int. Cl...................... F02b 53/00, F02m 31/06
[58] Field of Search ....... 123/8.01, 8.27, 8.31, 8.13, 123/8.45, 122 R, 122 A, 122 D; 165/52, 4, 9

[56] References Cited
UNITED STATES PATENTS
3,319,611  5/1967  Terazawa........................... 123/8.01
3,621,654  11/1971  Hull.................................. 165/52 X
3,623,463  11/1971  De Vries........................... 123/70 R FOREIGN PATENTS OR APPLICATIONS
1,020,274  2/1966  Great Britain..................... 123/8.45

*Primary Examiner*—William L. Freeh
*Assistant Examiner*—Michael Koczo, Jr.
*Attorney, Agent, or Firm*—Evert A. Autrey

[57] ABSTRACT

A rotary piston engine incorporating a regenerator and valve system for heating input air at constant volume after compression to increase engine efficiency. A catalyst may be added to the regenerator and supplementary air may be injected into the system to reduce the emission of pollutants.

6 Claims, 8 Drawing Figures ent combustion engines, and more particularly to means for improving the efficiency of rotary piston engines and to means for reducing the amounts of objectionable exhaust products from internal combustion engines.

ROTARY PISTON ENGINE

BACKGROUND OF THE INVENTION

This invention relates to internal combustion engines, and more particularly to means for improving the efficiency of rotary piston engines and to means for reducing the amounts of objectionable exhaust products from internal combustion engines.

The efficiency of conventional internal combustion engines increases as the compression ratio is made greater. It is well known that the compression ratio of an Otto-cycle engine, where the air-fuel mixture is drawn into the engine and compressed before ignition, is limited in magnitude for practical operation by the combustion characteristics of the fuel to avoid eratic combustion or knocking. This limitation is avoided in the Diesel-cycle engine where the fuel is injected after compression of the air to a sufficiently high temperature for ignition of the fuel injected into the compressed air. Also, the favorable conditions for ignition and combustion of the fuel in the Diesel-cycle engine permit the use of a lower fuel-air ratio. The lower fuel-air ratio and improved conbustion conditions reduce the amounts of carbon monoxide and hydrocarbons emitted from Diesel-cycle engines. However, such engines must be heavily and expensively constructed to withstand the high forces encountered at high compression ratios.

SUMMARY OF THE INVENTION

It is, therefore, an objective of this invention to provide a rotary-piston engine with the combined advantages of high efficiency and low hydrocarbon and carbon monoxide emission products and the advantages of the rotary-piston engine of compactness, light weight, and simplicity. In a conventional rotary-piston engine, it is difficult in a single stage to obtain compression ratios sufficiently high for practical Diesel-cycle operation. Furthermore, the efficiency of the Diesel-cycle engine decreases as the fraction of the cycle for fuel injection increases because heat energy released during the last part of the burning cycle goes out the exhaust without doing much useful work. Therefore, short-duration fuel injection is needed for high Diesel-engine efficiency.

In order to obtain the advantages of a rotary-piston engine with fuel injection into the combustion chamber and to avoid some of the limitations of the Diesel-cycle engine, a heat exchanger or regenerator has been provided for a rotary piston internal combustion engine. This regenerator heats the air after compression while this air is being transferred from the compression chamber through an external regenerator and returned into the combustion chamber of the engine. This heating process during transfer of the compressed air is approximately a constant volume process since the volume in the compression chamber at the start of the transfer process is approximately the same as the volume of the combustion chamber at the completion of the process. The exhaust products from the engine flow through the regenerator to heat the compressed air. As a result of the increase in temperature from compression and from this constant-volume heating in the regenerator, this hot and compressed air transferred to the combustion chamber will ignite the fuel injected into the combustion chamber or alternatively a separate ignition device may be used. The hot combustion products expand in the combustion chamber until they are released through the regenerator. The operation of this engine differs from the operation of either a conventional Otto-cycle or Diesel-cycle engine in that there is a constant-volume heating process with heat supplied from the engine exhaust. The construction of this rotary-piston engine provides for the transfer of the compressed air through an external regenerator by having a minimum clearance between the rotor face and the epitrochoidal housing in the area of the minor axis of this housing between the outlet from the compression chamber and the inlet to the combustion chamber. There is therefore no depression in the rotor face which serves in a conventional rotary piston engine to provide part of the combustion volume.

It is another objective of this invention to reduce the amounts of objectionable materials in the exhaust products by using the regenerator as a reaction chamber. Air can be injected into the regenerator with the hot exhaust products to complete the oxidation of materials in the exhaust gas. Also, a catalyst such as platinum or palladium dispersed on a catalyst carrier can be placed in the regenerator in contact with the exhaust gas to reduce the amount of oxides of nitrogen and to promote the complete oxidation of carbon compounds in the exhaust gas.

Other objects and many of the attendant advantages of this invention will be readily appreciated as the same becomes better understood by reference to the following description.

DESCRIPTION OF PREFERRED EMBODIMENTS

Figure 1:
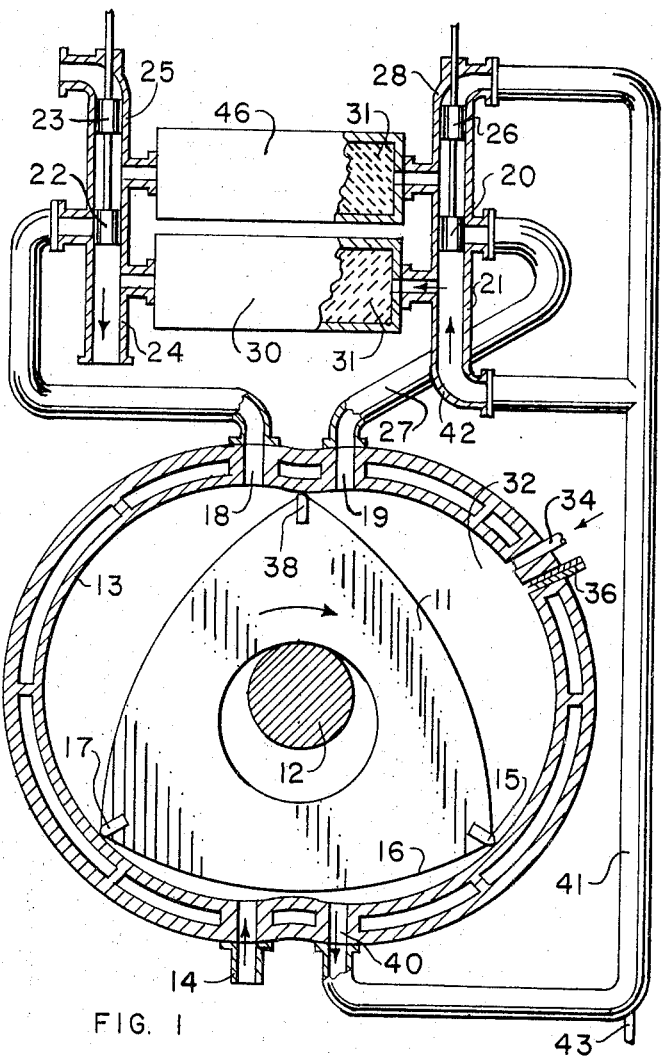
FIG. 1 is a side view, partly in section, showing a rotary piston engine, regenerator, and associated piping and valves.
Figure 2:
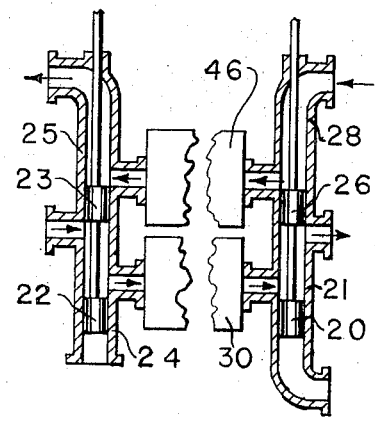
FIG. 2 is a diagrammatic view of the valves and regenerator showing one section of the regenerator being heated by exhaust gas and the other section providing heat energy to compressed air moving toward the combustion chamber of the engine.
Figure 3:
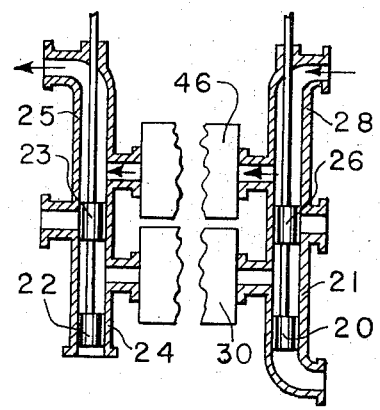
FIG. 3 is a similar view of the valve system showing a different portion of the engine cycle.
Figure 4:
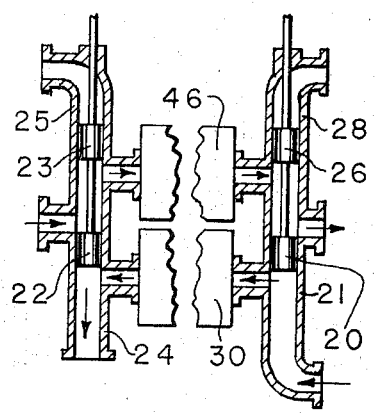
FIG. 4 is a similar view of the valve system showing still another portion of the engine cycle.

For a more complete understanding of the invention reference may be made to the following description thereof and to the drawings of which FIG. 1 is a diagrammatic illustration of a rotary-piston engine with direct-contact regenerator, and FIGS. 2, 3, and 4 are diagrammatic illustrations of the valve positions at different points in the cycle. The rotor 11 turns with the power shaft 12 in a clockwise direction inside the epitrochoidal housing 13. Air is drawn into the engine through port 14 and this air is compressed between a face of the rotor 11 and the housing 13 after an apex of that rotor face passes the inlet port 14. Flow of compressed air through the port 18 is blocked by the valve spool 22 in the valve chamber 24 in the position shown in FIG. 1. Referring to FIG. 2, when apex 38 of the rotor passes the port 19, the valve spools 22, 23, 20 and 26 in valve chambers 24, 25, 21 and 28 respectively move to the positions shown and compressed air then flows through port 18 thence through the lower direct-contact regenerator 30 filled with hot heat-storage material 31 such as a packing of fine wire or porous ceramic material. This packing also may be a catalyst carrier. The compressed air is heated as it flows through this hot packing and the heated compressed air flows out through valve chamber 21 and into the combustion chamber 32 through port 19. The compressed air is transferred from the compression chamber into the combustion chamber through the regenerator until the following apex of the rotor passes port 18. Fuel is then injected into the hot compresssed air in combustion chamber 32 through injector 34. The fuel is ignited by the hot compressed air or by an ignition device 36. The fuel burns and the hot combustion products expand until apex 38 of the rotor passes the exhaust port 40, releasing the exhaust to the regenerators through conduit 41.

While the valves are in the position shown in FIG. 1 hot exhaust products flow out through exhaust port 40, conduit 41, conduit 42, and lower direct-contact regenerator 30 thereby heating the heat storage material 31 before exhausting through valve chamber 24. As the rotor 11 turns through successive 60-degree intervals starting with the position shown in FIG. 1, the corresponding valve positions in sequence are as shown in FIGS. 1, 2, 3, 4, 1, 2, 3, 4, etc. In FIG. 3 the valve settings are such that exhaust gas will enter upper regenerator 46 through valve chamber 28 and be released to the atmosphere through valve chamber 25. In FIG. 4 the compressed air charge enters the hot upper regenerator 46 to accept heat energy before being directed by valves 20, 22, 23, and 26 into conduit 27 leading to the combustion chamber 32 of FIG. 1. At the same time hot exhaust gas passes through regenerator 30 before release through valve chamber 24. Thus it is seen that the sequence of valve positions repeats every two-thirds revolution of the rotor 11. The cam mechanism, not shown, to drive the valves in valve chambers 21, 24, 25, and 28 is designed to provide the required sequence of valve positions. The hot exhaust products and the compressed air flow alternately over the heat storage material 31 in the direct-contact regenerators 30 and 46.

Air can be injected into the exhaust through the inlet 43, if desired, and the direct-contact regenerators 30 and 46 provide a volume for further oxidation of carbon compounds in the exhaust. A catalyst dispersed on a catalyst carrier in these direct-contact regenerators 30 and 46 can reduce the amount of nitrogen oxides in the exhaust and aid in the oxidation of carbon compounds.

The operation of this engine has been illustrated with slide valves; however, other types of valves such as poppet or rotary valves may be used. Also, outlet and inlet openings have been shown in the periphery of the epitrochoidal housing although these outlet and inlet openings could be positioned in the end plates of the casing. Furthermore, the engine is shown with a two-lobe housing and three-lobe rotor whereas other rotary piston engine arrangements may be used such as, by way of example, a three-lobe housing with four-lobe rotor or an engine with n number of chambers and n+1 lobed rotors.

Figure 5:
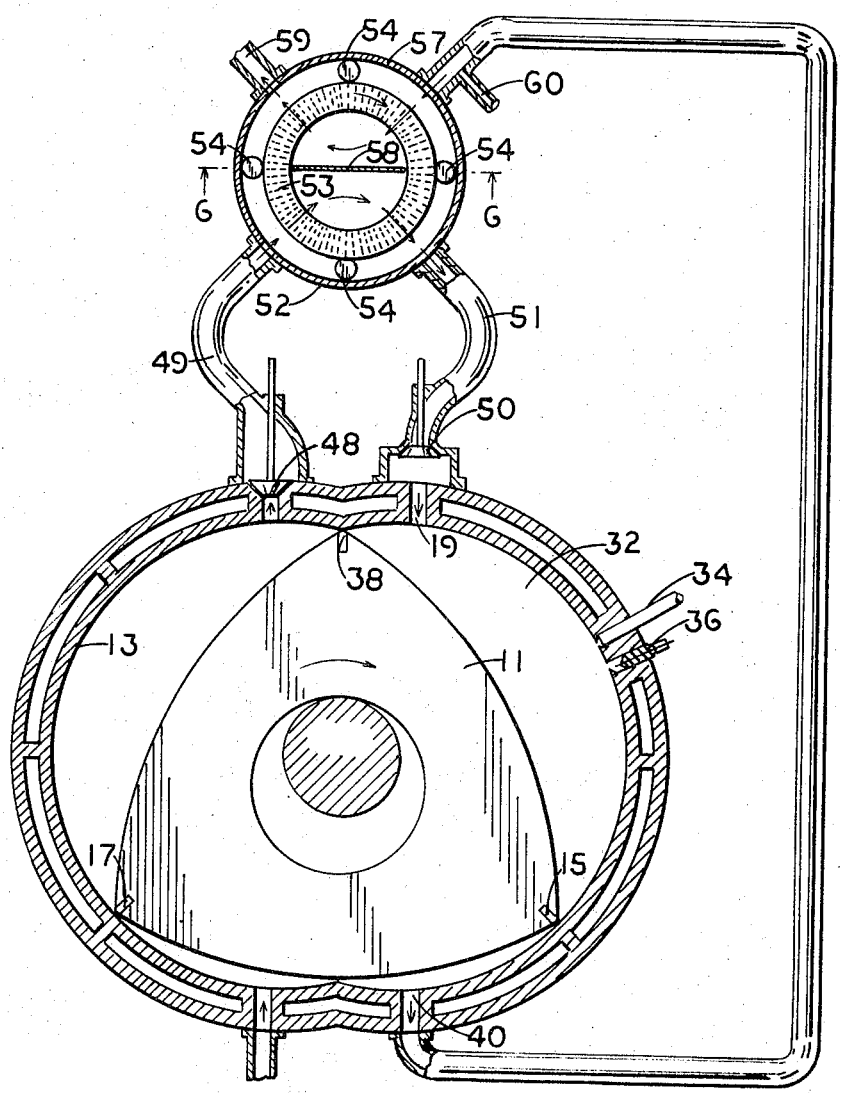
FIG. 5 shows a modified form of regenerator and valve system for a rotary piston engine.
Figure 6:
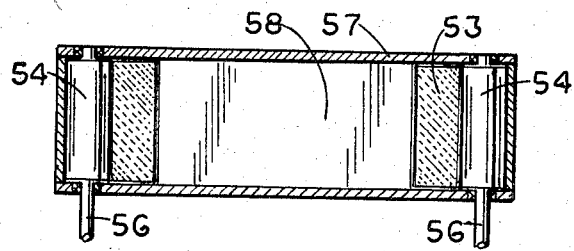
FIG. 6 is an enlarged view along section lines 6—6 of the regenerator shown in FIG. 5.

Another form of this invention is illustrated diagrammatically in FIGS. 5 and 6. Here valves 48 and 50 remain closed during the compression of the charge between the rotor 11 and the casing 13. After an apex of the engine rotor passes the port 19, valves 48 and 50 are opened by the valve mechanism actuated by a cam, not shown, or by pressure difference. The charge is then transferred in an approximately constant volume process through the rotary regenerator 52 where the charge is heated by contact with the hot heat-storage rotor 53. After the charge has been heated and transferred into the combustion chamber 32, fuel is injected through injector 34 and the fuel may be ignited by the hot charge of air or by an ignition device 36. The valves 48 and 50 are closed during the combustion and expansion process. The hot combustion products are discharged through outlet 40 and flow through the upper chamber of rotary regenerator 52 to reheat the energy storage rotor 53 before release to the atmosphere through conduit 59.

The regenerator rotor 53 is supported and rotated by rollers 54 driven by shafts 56. These rollers also seal the space between the rotor 53 and the casing 57 to prevent circumferential flow. The flow of the exhaust gas is separated from the flow of the compressed charge in the center volume of the regenerator by partition 58. The flow channels through the heat-storage rotor 53 are radial so that the gases do not move circumferentially. As the regenerator rotor turns, the heated heat-storage material is moved from the exhaust gas into the compressed charge.

Air can be injected into the exhaust through inlet 60 if desired, and the regenerator provides a volume for further oxidation of carbon compounds in the exhaust. Also a catalyst dispersed on a catalyst carrier can be added to the regenerator rotor in order to reduce the amount of nitrogen oxides in the exhaust and to aid in the oxidation of carbon compounds.

Figure 7:
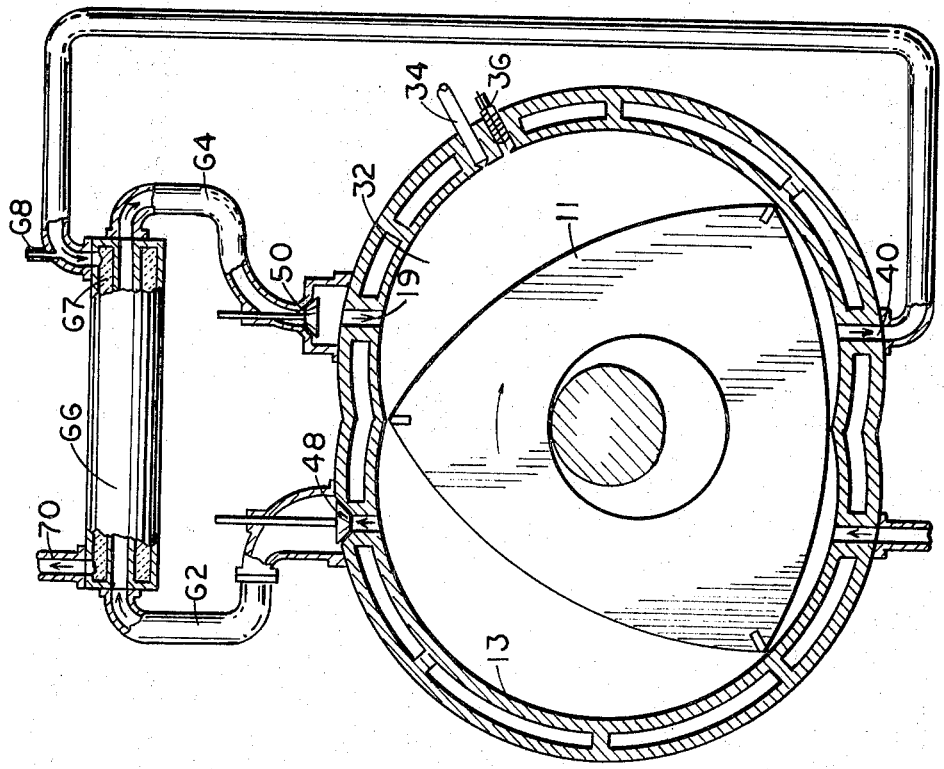
FIG. 7 is a view partly in section of a rotary piston engine with a different regenerator.

Another form of this invention is illustrated diagrammatically in FIG. 7. Here valves 48 and 50 remain closed during the compression of the charge between the rotor 11 and the casing 13. When an apex of the engine rotor passes the inlet 19, valves 48 and 50 are opened by a valve mechanism actuated by a cam or by pressure differences. The charge is then transferred in an approximately constant volume process through the heat exchanger 66 where the charge is heated by the hot exhaust from the engine. After the charge has been heated and transferred into the combustion chamber 32 fuel is injected through injector 34 and the fuel may be ignited by the hot charge of air or by an ignition device 36. The valves 48 and 50 are closed during the combustion and expansion process. The hot combustion products are discharged through outlet 40 and flow through the outer shell of heat exchanger 66 before discharge through conduit 70.

Air can be injected into the exhaust through inlet 68 and the heat exchanger provides a volume for further oxidation of carbon compounds in the exhaust.

In the operation of the engine thus described, the incoming air is compressed and thereby heated. Even with no depression in the rotor faces it is difficult to raise the air temperature high enough through the act of compression alone to cause injected fuel to ignite spontaneously. When the compressed air is passed through the hot regenerator it is further heated to a temperature which will ignite injected fuel. The volume of the regenerator is small so that the transfer of the heated air charge through the regenerator is substantially at constant volume. The engine may be started when the assembly is cold by heating the regenerator externally or by firing the combustion charge by means of an ignition device such as a spark plug until the regenerators are hot. Unlike the operation of conventional Diesel engines, there is no fuel utilization penalty in introducing fuel into the combustion chamber over a large fraction of the combustion cycle because energy not used to move the rotor is captured as heat energy by the regenerator and recovered by the incoming air charge.

Figure 8:
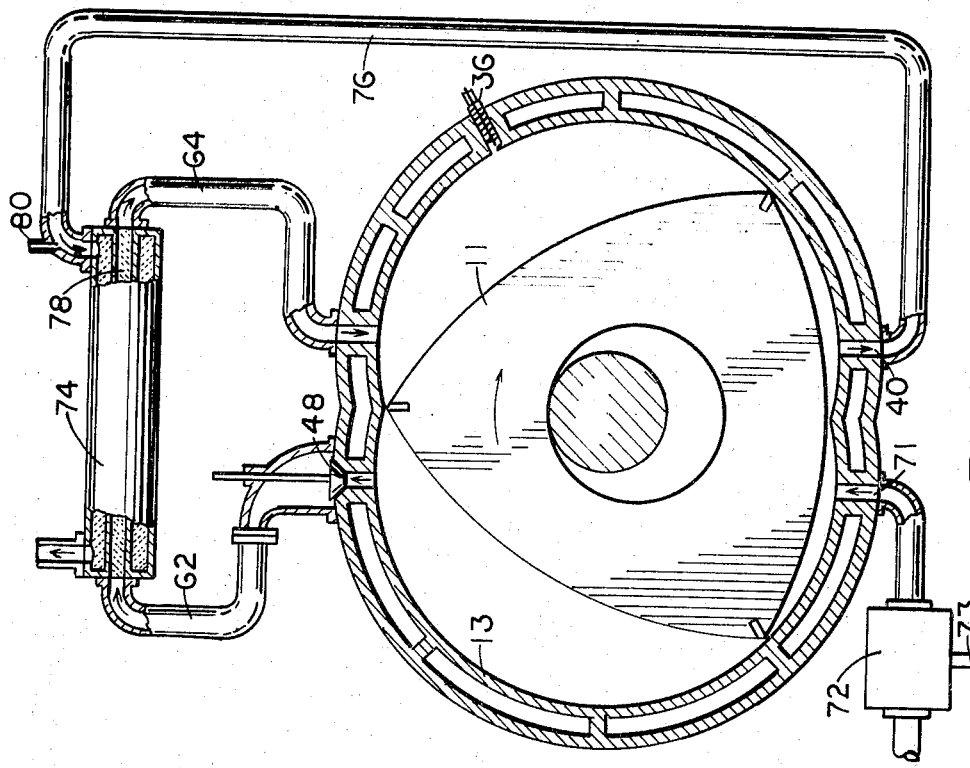
FIG. 8 is a view of a still further modified engine with regenerator, valving system, and carburetor.

Another form of this invention is illustrated diagrammatically in FIG. 8. An air-fuel mixture is drawn into the engine through inlet 71. A mixing device such as a carburetor 72 disperses the fuel entering with the air. Valve 48 remains closed during the compression of the charge between the rotor 11 and the casing 13. When an apex of the engine rotor passes port 19, the valve is opened by the valve mechanism actuated by a cam or by pressure differences. The charge then is transferred in an approximately constant volume process through the heat exchanger 74, where the charge is heated by the hot exhaust from the engine. After the charge has been heated and transferred into the combustion chamber, it is ignited by ignition device 36. Valve 48 is closed during the combustion and expansion process. The hot combustion products are discharged through outlet 40 and flow through conduit 76 to the outer shell of heat exchanger 74. The passages in the heat exchanger for the flow of the air-fuel mixture may be packed with fine wire 78 or other packing material to prevent flame travel back through the heat exchanger and to aid in heat transfer.

Air can be injected into the exhaust through inlet 80 and the heat exchanger provides a volume for further oxidation of carbon compounds in the exhaust.

The engine shown in FIG. 8 operates in the same manner as previously described engines except that the combustion charge is fired by the ignition device at all times.

Obviously many modifications and variations of the present invention are possible in the light of the above teachings. It is therefore to be understood that within the scope of the appended claims the invention may be practiced otherwise than as specifically described.

What is claimed is:

1. In a rotary piston internal combustion engine having a rotor moving in an epitrochoidal housing to define compression and combustion chambers the improvement comprising:
    a. a regenerator,
    b. conduit means for directing combustion gases from said combustion chamber to said regenerator,
    c. conduit means for directing compressed air from said compression chamber at substantially constant volume through said regenerator and thence to said combustion chamber, and
    d. valve means for controlling the flow of combustion gas and compressed air through said regenerator.

2. The engine of claim 1 wherein the faces of said rotor are completely convex.

3. The engine of claim 1 wherein said regenerator is a heat exchanger.

4. The engine of claim 1 comprising in addition means for injecting air into the combustion gases entering said regenerator.

5. The engine of claim 1 comprising in addition a catalyst disposed in said regenerator effective to promote complete oxidation of combustion products.

6. The engine of claim 4 comprising in addition a catalyst disposed in said regenerator effective to promote complete oxidation of combustion products.

* * * * *